United States Patent
Guionneau et al.

(10) Patent No.: US 10,133,861 B2
(45) Date of Patent: Nov. 20, 2018

(54) METHOD FOR CONTROLLING ACCESS TO A PRODUCTION SYSTEM OF A COMPUTER SYSTEM NOT CONNECTED TO AN INFORMATION SYSTEM OF SAID COMPUTER SYSTEM

(71) Applicant: EVIDIAN, Les Clayes Sous Bois (FR)

(72) Inventors: Christophe Guionneau, Grenoble (FR); David Cossard, Vaureal (FR); Gerard Dedieu, Montigny le Bretonneux (FR)

(73) Assignee: EVIDIAN, Les Clayes Sous Bois (FR)

( * ) Notice: Subject to any disclaimer, the term of this patent is extended or adjusted under 35 U.S.C. 154(b) by 89 days.

(21) Appl. No.: 15/119,038

(22) PCT Filed: Nov. 18, 2015

(86) PCT No.: PCT/FR2015/053121
§ 371 (c)(1),
(2) Date: Aug. 15, 2016

(87) PCT Pub. No.: WO2016/079429
PCT Pub. Date: May 26, 2016

(65) Prior Publication Data
US 2016/0357954 A1     Dec. 8, 2016

(30) Foreign Application Priority Data
Nov. 21, 2014 (FR) ..................... 14 61319

(51) Int. Cl.
*G06F 21/45* (2013.01)
*H04L 29/06* (2006.01)
(Continued)

(52) U.S. Cl.
CPC ............ *G06F 21/45* (2013.01); *H04L 9/0863* (2013.01); *H04L 9/0866* (2013.01); *H04L 9/14* (2013.01);
(Continued)

(58) Field of Classification Search
CPC ...... G06F 21/45; H04L 9/0863; H04L 9/0866
(Continued)

(56) References Cited

U.S. PATENT DOCUMENTS

2015/0134962 A1* 5/2015 Mahajan ............. H04L 63/0428
713/171
2017/0063531 A1* 3/2017 Sullivan .................. G06F 21/40

FOREIGN PATENT DOCUMENTS

FR      2 984 047 A1     6/2013
WO   2010/000116 A1     1/2010
WO   2010/116109 A1    10/2010

OTHER PUBLICATIONS

International Search Report, dated Apr. 12, 2016, from corresponding PCT Application.

* cited by examiner

*Primary Examiner* — Anthony Brown
(74) *Attorney, Agent, or Firm* — Young & Thompson

(57) ABSTRACT

A method (M) for controlling access to a production system (SIP) of a computer system not connected to an information system (SIC), includes: A) an initial phase of enrolling a user via a terminal (1) in the production system (SIP), which includes: a) providing a private encrypted key (Cph) associated with each account of the user in the production system (SIP); b) the terminal transmitting the encrypted private key (Cph) to the information system and the system (SIC) registering the encrypted private key; B) for each request to access the production system, a phase of authentication by the production system, which includes: the terminal of the user recovering a challenge (QRCb) generated by the production system, that only the encrypted key stored in the information system makes it possible to solve, the key only being capable of being obtained after the terminal has been authenticated by the information system.

20 Claims, 3 Drawing Sheets

(51) Int. Cl.
*H04W 12/06* (2009.01)
*H04L 9/08* (2006.01)
*H04L 9/14* (2006.01)
*H04L 9/30* (2006.01)
*H04L 9/32* (2006.01)
*H04W 12/04* (2009.01)

(52) U.S. Cl.
CPC .............. *H04L 9/30* (2013.01); *H04L 9/3263* (2013.01); *H04L 63/06* (2013.01); *H04L 63/0823* (2013.01); *H04W 12/04* (2013.01); *H04W 12/06* (2013.01); *H04L 63/083* (2013.01); *H04L 63/0853* (2013.01)

(58) Field of Classification Search
USPC ........................................................ 713/156
See application file for complete search history.

METHOD FOR CONTROLLING ACCESS TO A PRODUCTION SYSTEM OF A COMPUTER SYSTEM NOT CONNECTED TO AN INFORMATION SYSTEM OF SAID COMPUTER SYSTEM

FIELD OF THE INVENTION

The invention relates to a method for controlling access to a production system (SIP) of a computer system, not connected to an information system (SIC) of the computer system.

The method relates more particularly to a method for controlling access to applications of the production system so as to prevent access to said system by unauthorized users.

Computer system is defined here as a computer network of an enterprise comprising a central information system (SIC), and a production system (SIP).

Central information system (SIC) is defined as a computer network that has applications comprising the data for identification of the users of the network and/or of the personnel of the enterprise. The central information system, referred to hereafter as an information system (SIC), has a device for controlling access and for identification of the users that employs an authentication mechanism that appears in the form of a program and of data residing on a server referred to as an authentication server.

Production system (SIP) is defined as a computer network having critical applications for the enterprise, namely applications that must be protected with regard to the outside world but also with regard to a portion of the unauthorized users of the network. Controlling access to these applications is done by the information system (SIC) of the production system (SIP). Each user is authenticated and his accesses are granted based on his identity; each operation is checked to determine subsequently the actions performed by the users in case of an attempt to improperly use the applications.

Access control is defined as controlling the users' accesses and identities.

It is thus understood that it is necessary to establish authentication mechanisms that are strong enough to guarantee that the authenticated user is not an impersonator.

This need is apparent quite particularly when the applications of the production system are applications that come from the control and data acquisition system such as applications of the "SCADA" Supervisory Control and Data Acquisition type. This is the case for, for example, the applications that make it possible to process on a large scale and in real time a large number of remote measurements and to control technical installations remotely such as energy production and distribution installations.

Thus, not only is an access control required for such applications but also this control must be rigorous and have authentication mechanisms that ensure the identity of the users.

Technical Problem

The authentication of the users must be performed at the level of the applications of the production system or during accessing of the network and of the computer equipment, workstation, application portal for the applications, or the like, in the network of the production system. These authentications, however, cannot be controlled by the security and authentication devices of the information system of the enterprise in another network that is not connected to the production network.

The methods for managing the accesses and identities of the users that already exist in the information system of the enterprise cannot perform the same functions in the production system that is physically separated.

It is therefore necessary that the authentications performed to access the production system be controlled, checked and authorized by the information system. It is nevertheless crucial to maintain the strict isolated nature of the networks without adding a link between the production system and the outside world. Moreover, the methods of authentication used to access the production network must comply with the standards of current security, strong authentication and multi-factor authentication, stronger than simple passwords.

Furthermore, the authentications made for the production system must respond to the following characteristics:
  Be suitable for Web-type applications or Web-application-portal-type applications.
  Make it possible to be authenticated on Windows-type workstations for accessing the thick-client-type applications (i.e., the workstations on which applications are installed).
  Propose a strong multi-factor authentication.
  Be controlled by a separate information system, i.e., not connected to the network of the production system.

PRIOR ART

Most of the known solutions consist in the duplication of the mechanisms for managing accesses and identities of the users in the production system. The production system therefore has its own authentication mechanisms that can be applied to the managing of the accesses to the applications and to the workstations; the resulting generated data can be "uploaded" to the information system through a diode-type (unidirectional) link, but the authentication mechanisms are disconnected from the information system (SIC). The resulting data are uploaded asynchronously on a daily basis; the link used is not continuous and cannot be used to exchange synchronous information in real time.

The current mechanisms for managing One-Time-Password-type authentication (single-use password), or a HOTP/TOTP (HMAC-based One-Time Password/Time-based One-Time Password) token system, depend on the use of a server that is necessarily linked to the computer system that verifies the authentication.

The HOTP/TOTP-type authentication mechanisms rely on the principle of an authentication server in which the identifications of the users are stored, and keys are synchronized with the password-generating application, most often in the form of an application for a mobile telephone. The application of the mobile telephone generates a single-use password that is verified by the server on the basis of data associated and synchronized with each user. If this server is housed in the information system (SIC), the principle of partitioning is severed.

Reference also can be made to the document WO2010/116109, which is considered to be the closest state of the art. However, the control method described in this document does not provide an answer to improving the authentication of the users while ensuring an increase in security.

The method for controlling access proposed according to the invention makes it possible to solve this problem.

For this purpose, according to the invention, a method for controlling access is proposed that makes it possible to apply the same principles for controlling accesses to and identities of the production systems under the control of the information system of the enterprise so as to obtain a single management of the accesses and identities while maintaining the partitioning, i.e., the non-linking between the production system and the information system.

The method proposed brings a simplification to the control of the access to the applications of the production systems that are not connected (to the information system) and an increased security relative to the solutions of the prior art.

The simplification results from the use of the authentication mechanism and data relative to the users of the information system (SIC) without needing to duplicate this mechanism and the data on the production system (SIP), and from the storing of encrypted private keys for the users on the information system, making it possible for them, after authentication, to obtain them and to decrypt them so as to decode a challenge appearing in the form of an image encryption code, generated by the production system (SIP) during a request for access from a user. Said image encryption codes are recovered by the terminals of the users requesting access.

More particularly, the invention has as its object a method (M) for controlling access to a production system (SIP) of a computer system by a user identified with said production system (SIP), the production system not being connected to an information system (SIC) of said computer system, the information system (SIC) comprising authentication means, the method being mainly characterized in that it comprises the following steps:

A) An initial phase of enrolling a user in the production computer system (SIP) by means of a terminal (1) comprising:
  a) the furnishing to the user's terminal of an encrypted private key (Cph) associated with each account of the user in the production system (SIP),
  b) the transmission by the terminal (1) of the encrypted private key (Cph) containing a private key (kpv) and the storing by the information system (SIC) of said encrypted private key (Cph).

B) Then, for each request for access to the production system (SIP) by the user, by means of a station (P) linked to the production system, a phase for authentication by the production system (SIP) comprising:
  the recovery by the user's terminal (1) of an image encryption code (QRCb) displayed on said station (P), comprising an encrypted piece of data (Cph) associated with the account of the user and that can be decrypted by means of the associated private key (kpv) and stored in encrypted form in the information system (SIC),
  the linking of the terminal (1) to the information computer system (SIC) and the authentication of the user by said information system (SIC),
  the transmission by said system (SIC) to the user's terminal (1) of the stored encrypted private key (Cph) for the user account,
  the decrypting by the terminal (1) of the encrypted private key (Cph) with a secret key (ks) so as to obtain the private key (kpv) that makes it possible to decrypt the image encryption code recovered by the terminal (1) and to obtain the password (PWD) authorizing access to the user account of the production system.

According to another characteristic, the furnishing to the user's terminal (1) of an encrypted private key associated with each account of the user in the production system (SIP) comprises:
  an authentication of the user by the production system,
  the generation by said production system (SIP) of a first image encryption code (QRC1) containing a piece of data (Cph) encrypted with a public key (Kpu) and a second image encryption code (QRC2) containing the private key (Kpv),
  and the recovery of said code by the terminal (1);
  the decoding of the encryption code (QRC2) to obtain the private key (kpv),
  the decrypting of the piece of data encrypted with the private key (Kpv).

According to another characteristic, the phase A) further comprises the steps of:
  encryption by the terminal of said private key (kpv) by a secret key (ks),
  linking to the information system (SIC) and authentication by the information system (SIC) from said terminal.

Advantageously, the secret encryption key (ks) is stored in the terminal and is obtained from a unique identifier of the terminal (1) or during the phase A) or generated randomly by the terminal or generated by the terminal from a secret phrase "passphrase" communicated by the user.

According to another characteristic, the phase B) comprises the initial step of entering a piece of identification data ID of the user at a station (P) linked to the production system (SIP).

Advantageously, the enrollment from the terminal (1) of a user in the production computer system (SIP) comprises an initial step:
  of authentication of the user by means of an identifier (ID) stored in the production system (SIP).

According to another characteristic, the link to the information system (SIC) and the authentication by the information system (SIC) from said terminal comprises:
  During the enrollment step,
    The identification of the user of the terminal by an identifier (ID) and the storing of this identifier in the information system (SIC),
  Then, during the subsequent links:
    The verification of the identifier (ID) received by the information system (SIC) and the stored identifier (ID) for this user.

Advantageously, the link to the information system (SIC) by the terminal of the user and the authentication by said information system (SIC) are performed by a secure protocol (3) used by an application (2) stored on the terminal.

The terminal (1) is a terminal equipped with image-capturing optical means such as a mobile telephone or a portable tablet and/or with a link for wireless short-range and high-frequency communication. Advantageously, such a short-range wireless communication is achieved by Bluetooth or NFC (Near Field Communication).

According to another characteristic, the encrypted private keys associated with each account of the user in the production system (SIP) are in the form of image encryption codes (QRC1 and QRC2) composed of:
  A QR code; or
  A datamatrix;
  A bar code.

Advantageously, the link to the station (P) of the user comprises:

a link via said station to the production system (SIP) or to a WEB application or to a WEB portal of the production system, the entry by the user of the identifier (ID) in the station (P), the generation and the display of the encryption code (QRC2) on the screen of said station (P) or in an authentication banner of the WEB application or of the application portal.

Advantageously, the linking to the information system (SIC) comprises a link of the WEB Service or REST type on an HTTPS protocol.

According to another characteristic, the connection is made secure by means of a certificate from the authentication server of the information system, the terminal of the user having said certificate or having a certificate from the certification authority of the certificate.

The invention also has as its object a terminal (1) suitable for recovering image encryption codes (QRC1, QRC2, QRCb), the terminal comprising a processor (PR) that makes it possible to decode said image encryption codes and to obtain the private key (kpv), to encrypt the private key by means of a secret key (ks) transmitted by the production system (SIP) or generated by said processor of the terminal (1), the terminal (1) also being able to be linked to an information system (SIC), to use a mode for authentication with said information system (SIC) and to transmit, for storing, the encrypted private key (Cph) relative to the user account of the terminal.

The secret key generated by the processor of the terminal can be generated by a random generator of the processor and thus be a purely random piece of data or be generated by said processor from a secret phrase "passphrase" communicated by the user via his mobile telephone.

According to another characteristic, the terminal (1) has an application (2) controlled by the processor (PR), which can use a mode for authentication with an information system (SIC) via a secure link, the identifications (ID) of the users and the authentication mode (PW or CERT) being stored in the information system (SIC).

Advantageously, the application (2) controlled by the processor of the terminal (1) transmits a secret phrase "passphrase" request to the user during the generation of the secret key (ks) and then before any use by the terminal.

According to another characteristic, the application (2) of the terminal is able to decrypt the encrypted private key (Cph) furnished by the information system (SIC), when this encrypted private key corresponds to the key encrypted with the secret key (ks) associated with the user account that it possesses.

The invention also has as its object a system for controlling access to a production system (SIP) that is not connected to an information system (SIC) of a computer system, mainly characterized in that it comprises:

a terminal according to Claims 14 to 16, in that the production system (SIP) has in memory identifiers of the user accounts and the public keys (kpu) and private keys (kpv) associated with each user, and is able to encrypt a private key (kpv) by means of the associated public key (kpu) and to generate an image encryption code (QRC2) comprising said private key and in that the information system (SIC) has a server (S) that has an authentication base or is connected to an authentication server.

BRIEF DESCRIPTION OF THE DRAWINGS

Other particularities and advantages will appear upon reading the following description made by way of illustration and not limiting, with reference to the accompanying figures that show.

DETAILED DESCRIPTION OF THE INVENTION

The invention relates to a method for controlling access to a production system (SIP) of a computer system that is not connected to an information system (SIC), said method having —A) an initial phase for enrolling a user by means of a terminal (1) in the production system (SIP), comprising —a) the furnishing of an encrypted private key (Cph) associated with each account of the user within the production system (SIP), —b) the transmission by the terminal (1) of the encrypted private key (Cph) to the information system (SIC) and the storing by said system (SIC) of the encrypted private key (Cph) —B) for each request for access to the production system (SIP), a phase for authentication by the production system (SIP) comprising—the recovery by the terminal (1) of the user of a challenge (QRCb) generated by the production system, which only the encrypted key stored in the information system (SIC) makes it possible to solve, this key being able to be obtained only after authentication of the terminal by the information system (SIC).

Figure 1:
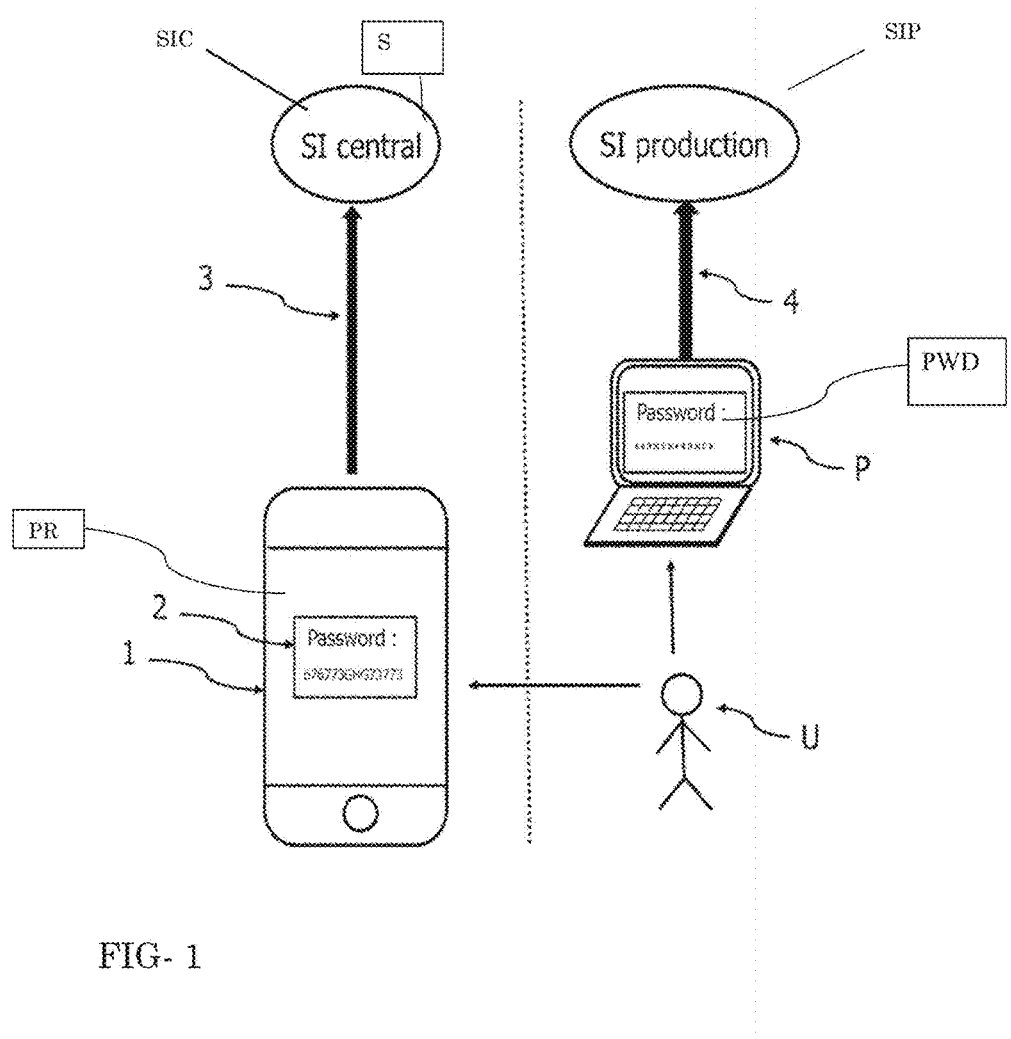
FIG. 1, a diagram of a system for implementing the method according to the invention, FIG. 2, a diagram of the two main phases A) and B) of the method according to the invention, FIG. 3, a detailed diagram of the step a).
Figure 2:
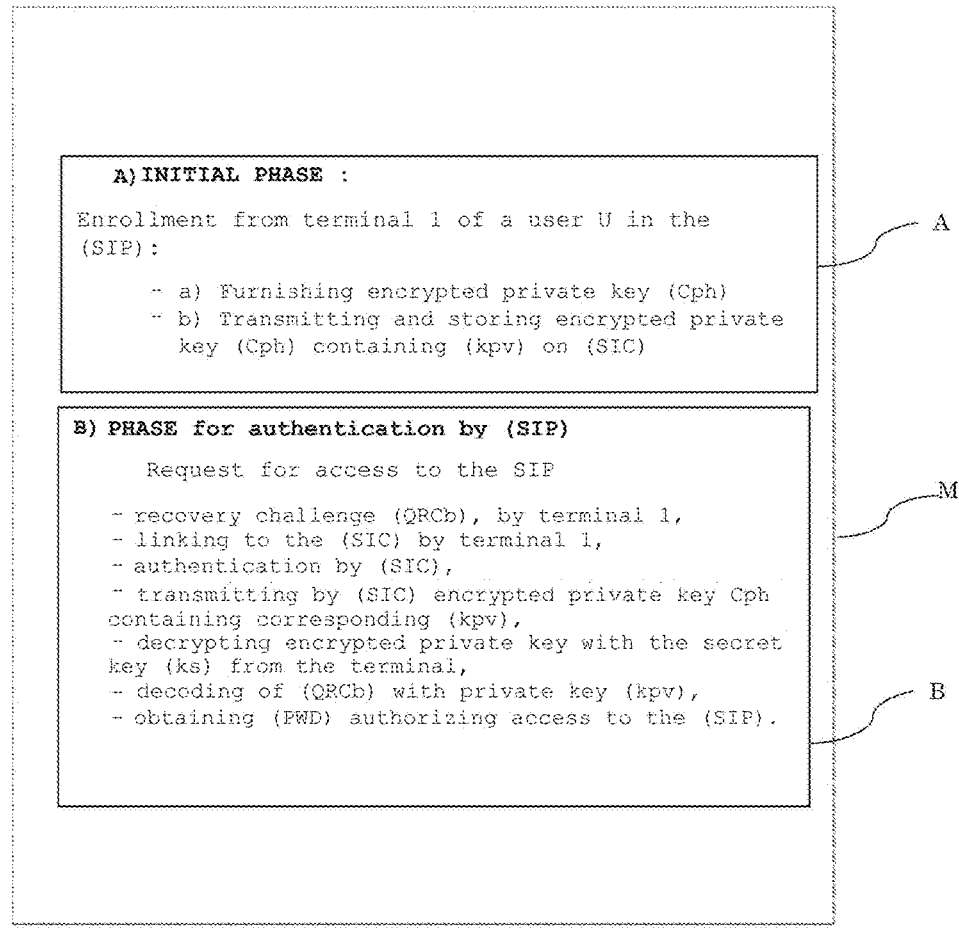
Figure 3:
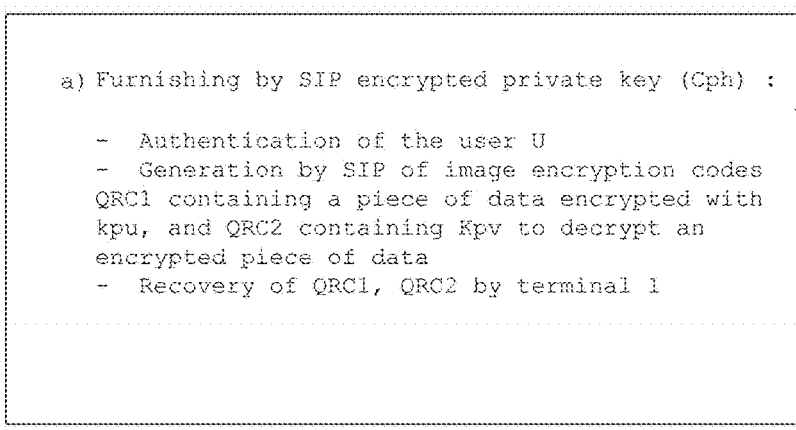

FIG. 1 is the diagram of a system for implementing the method according to the invention. The system comprises a production system SIP, an information system SIC, a user terminal 1, a user station P connected to the computer network of the production system SIP. The information system SIC and the production system SIP are separate, i.e., not connected.

In the embodiment described below, the terminal is a mobile telephone 1 having the application 2 controlled by a processor PR. The information system SIC has a server S and the production system SIP has the station P and applications that are accessible on the station P or on the WEB or on a WEB application portal.

A) Enrollment Phase of the Application 2 of the Mobile Telephone in the Production System SIP.

This phase makes it possible to generate single-use passwords PWD making it possible for a user authenticated by the information system SIC to access the production system. The identifier of the mobile telephone is stored on the servers of the two systems SIC and SIP.

Actually, the enrollment makes it possible to furnish to the application 2 of the mobile telephone 1 of the user U a private key associated with the account of the user within the production system SIP. In a preferred embodiment, the enrollment phase relies on the use of image encryption codes QR-Code® to transmit the private keys associated with the different accounts of the user U. The use of QRCode® to transmit encrypted data is described in the patent FR 1161430 published under No. 2 984 047 on Jun. 14, 2013. However, other mechanisms for transmitting secret information can be used, such as, for example, a non-optical transmission by a link for a near field communication, i.e., a short-range and high-frequency wireless communication technology such as Bluetooth or NFC (Near Field Communication).

The user U has an authentication mechanism available in the production system SIP that makes it possible for him to access the enrollment service of the mobile application 2 and of the mobile telephone 1. Optionally, the number IMEI, or a hardware identifier of the mobile telephone, is known from the information system (SIP).

The user accesses an enrollment service application from the production system SIP after authentication.

The enrollment service application generates a pair of encryption codes QRC1, QRC2 comprising encrypted data Cph, Kpv. The encrypted piece of data Cph that must safeguard the application of the mobile telephone 2 is displayed in the form of a QR-Code® to be scanned. It can also be a display of a character string to be entered. The production system SIP thus transmits to the application of the mobile telephone the encrypted private key Cph containing the kpv key that corresponds to the public encryption key Kpu maintained by the production system SIP.

Either one of the QR-codes contains the secret key ks as well as optionally the hardware unique identifier or IMEI number of the mobile telephone. Then, the application 2 of the terminal stores ks, optionally uniquely if the IMEI number of the mobile telephone is good.

Or the production system SIP does not transmit a secret key ks, the application of the mobile telephone then generates a random key ks that is not transmitted to the production system SIP nor to the information system SIC. This solution is the one that offers the most security.

To be able to scan the QR-Code® encryption code, or to enter manually the encrypted key Cph, the application of the mobile telephone 2 requests at the outset an authentication to the information system SIC and can then carry out the transfers of information (in this case, the transfer of the encrypted private keys) to the information system SIC. The steps are then the following:

The user U starts the execution of the mobile application 2.

The mobile application 2 requests an authentication to be connected to the information system SIC. This can be a password, a PIN code, or a biometric authentication to make available the use of an X509v3 certificate of the mobile telephone 1 or any other authentication means available in the SIC.

The user U can then, with the application 2, scan or enter the encryption code that is displayed by the enrollment service of the (SIP).

The application 2 uses the secure link 3 to safeguard the keys obtained from an authenticated storage service of the information system SIC. The keys can be super-encrypted with the key ks that resides in the mobile telephone 1 and that can depend on the identifier of the mobile telephone (IMEI number or hardware "device ID" of the mobile telephone), or be completely random and generated by the mobile telephone 1, or else, as described above, transmitted during the enrollment phase into the production system SIP.

The user U confirms the enrollment of his key by the entry of a code resulting from the decoding of the encrypted key Cph in the enrollment service of the SIP. This code is displayed by the application 2; this code proves that the procedure was correctly carried out.

Optionally, the user can enroll several keys that can be used to identify several accounts for different accesses to the applications of the production system (SIP).

B) Phase for Authenticating the User in the SIP.

The user is known from the production system SIP. He has already performed the phase of enrolling his application 2.

The user is known from the information system SIC; said user has an identifier ID and an authentication mode such as, for example, a password or a certificate stored on the information system SIC. The application 2 of his mobile telephone 1 is able to implement said authentication mode during the linking to the information system SIC by using the secure protocol 3.

When a user U wants to be linked to the production system SIP, he uses the station P, enters his identifier ID: user name and password, and the production system S generates a challenge QRCb that appears in the form of an image encryption code QR-Code®. The station P or WEB application presents a challenge QRCb that only the application 2 of the enrolled mobile telephone can resolve. Thus, the challenge QRCb can be decoded only if the user, after linking to the information system SIC with his terminal 1, is authenticated by said information system SIC. The information system SIC in this case furnishes the stored encrypted private key Cph (containing kpv) associated with the user account. This encrypted private key Cph can be decrypted by the terminal 1 of the user U if this terminal has the secret key ks, and the terminal 1 then obtains a single-use password PWD that gives access to the system SIP.

The application 2 of the mobile telephone does not have the private keys kpv; this application obtains them from the information system SIC by using the authentication mechanism of the information system SIC via the link 3. The link 3 is of the WebService or REST type on HTTPS protocol. This link is made secure by means of an X509v3 certificate of the server S of the information system SIC. The application 2 of the mobile telephone 1 knows either the certificate of the server S of the information system SIC or the certificate of the certification authority of the certificate of the information system SIC. The link 3 is advantageously encrypted and mutually authenticated, by the certificate of the information system SIC and by the method for authenticating the user with the information system SIC. The server of the information system SIC can itself verify the authentication of the user with an LDAP (Lightweight Directory Access Protocol), RADIUS (Remote Authentication Dial-In User Service), or Data Base authentication base, or can rely on an external authentication server that provides SAML (Security assertion markup language), Kerberos, OAuth, OpenId identity or any other protocol. The link 3 is realized on the GSM network in 2G/3G/4G or on a Wifi network; even if such networks cannot be considered secure, the security of the link is assured by the protocol and the mutual authentication.

Through the link 3, the mobile application 2 obtains the key necessary for the decryption of the challenge QRCb. The information system SIC has storage areas—"containers"—for the keys of each user, and delivers them only when the user U has performed a correct authentication with the information system SIC by using the authentication protocol supported by the application 2. Thus, only the application 2 of the enrolled mobile telephone 1 can use the private keys kpv of the user. Advantageously, the keys can be super-encrypted by using the encryption key ks that stays in the application 2 and that depends on the unique hardware identifier of the mobile telephone 1 or that is randomly generated by the mobile telephone or obtained during the phase for enrollment in the production system SIP by means of a QR-Code®.

Advantageously, to increase the security, the secret key ks held by the application 2 of the user's mobile telephone 1 can have been generated from a "passphrase," i.e., a secret phrase, or else can be protected by a "passphrase" that only the user U knows. This "passphrase" is requested from the user U before initializing the secure links 3 to the information system SIC; this "passphrase" has been requested, of course, by the mobile telephone in the case where the secret key ks is generated from said "passphrase" and, of course, before any use of the secret key ks.

When the application 2 has obtained the private key kpv associated with the user account from the production system SIP, the application generates and displays the single-use password PWD.

The user must then enter on the screen of the station P, or in the authentication banner of the Web application or of the Web application portal, the single-use password generated by the application 2.

The production system SIP is able to verify the response to the challenge QRCb and to authorize or not the user to be linked to the applications or workstation of the production system SIP.

The users of the production system SIP have available a strong method for authentication, which is controlled by the information system SIC and that is separate:

The user uses his mobile telephone 1 and the application to resolve a challenge and to generate a single-use password.

The user must use a second authentication means in a separate system to use the application of the mobile telephone.

The authentication method is performed by a multi-factor authentication means of the "something I have" type; the enrolled mobile telephone, and "something I know"; the authentication in the information system of the enterprise.

The information system of the enterprise SIC controls who is authenticated and can revoke the means for authenticating the user without a link with the production information system.

The application of the mobile telephone 2 does not have the keys for generating single-use passwords. Thus, the theft of a mobile telephone does not compromise the security of the authentication method.

The information system SIC cannot use the keys for generating unique passwords that can be super-encrypted with a key that depends on the mobile telephone. The means for safeguarding the keys in the information system SIC can be compromised without the keys being usable to access the production information system SIP.

Each authentication in the production system SIP synchronously generates audit events in the information system SIC.

Practical Embodiment

Service is defined as applications (computer programs) and resources able to implement the service.

The user enrolls his mobile telephone thanks to the "QRentry®" application 2 developed by the Evidian Company stored on his mobile telephone, through a series of QR-Code® displays by an authenticated enrollment service application (Web interface or Windows thick-client interface).

The QRentry® application 2 requires an authentication to allow users to be linked to a service for storing keys in the information system SIC. This storing service is secure thanks to the use of a service for controlling access to the Web—"Web Access Manager"; it is a REST (REpresentational State Tranfer)-type Web service that relies on a database to safeguard and access the encrypted keys.

The accesses to the applications in the production system SIP are protected either by the Web Access Manager service for Web applications, or by Authentication Manager and E-SSO for thick-client applications. In both cases, a QR-Code®-type challenge is displayed to access the applications of the production system whose access is controlled.

The QRentry® application 2 is capable of scanning the challenges presented in the form of a QR code, of recovering synchronously the encrypted keys from the information system, and of generating a single-use password.

The two systems—information system SIC and production system SIP—are not linked together.

The invention claimed is:

1. A method for controlling access to a production system of a computer system by a user identified with said production system, the production system not being connected to an information system of said computer system, the information system comprising an authentication system, the method comprising the following steps:

A) an initial phase of enrolling a user in the production system by a terminal comprising:
  a) receiving, at the user terminal from the information system, an encrypted private key associated with each account of the user in the production system, and
  b) transmitting, by the terminal, the encrypted private key containing a private key and storing by the information system said encrypted private key; and B) then, for each request for access to the production system by the user, by a station linked to the production system, a phase for authentication by the production system comprising:
  recovering, by the terminal of the user, an image encryption code displayed on said station, the image encryption code comprising a piece of encrypted data associated with the account of the user, the piece of encrypted data configured to be decrypted by the associated private key and stored in encrypted form in the information computer system,
  linking the terminal to the information computer system and authenticating the user by said information computer system,
  transmitting, by said information computer system to the user terminal, the stored encrypted private key for the user account, and
  decrypting, by the terminal, the encrypted private key with a secret key to obtain the private key that decrypts the image encryption code recovered by the terminal and to obtain a password authorizing access to the user account of the production system.

2. The method for controlling access to the production system according to claim 1, wherein:
  the receiving at the user terminal of the encrypted private key associated with each account of the user in the production system comprises:

authenticating the user by the production system,
generating, by said production system, a first image encryption code containing a piece of encrypted data with a public key and a second image encryption code containing the private key,
recovering said code by the terminal,
decoding the encryption code to obtain the private key, and
decrypting the piece of encrypted data with the private key.

3. The method for controlling access to the production system according to claim 1, wherein the phase A) further comprises the steps of:
encrypting, by the terminal, said private key by a secret key, and
linking to the information system and authenticating by the information system from said terminal.

4. The method for controlling access to the production system according to claim 1, wherein the secret encryption key is stored in the terminal and is obtained from a unique identifier of the terminal or during the phase A), generated randomly by the terminal, or generated by the terminal from a secret phrase communicated by the user.

5. The method for controlling access to the production system according to claim 1, wherein the phase B) comprises the initial step of entering a piece of identification data of the user at the station connected to the production system.

6. The method for controlling access to the production system according to claim 1, wherein the enrolling from the terminal of the user in the production computer system comprises an initial step of authenticating the user by an identifier stored in the production system.

7. The method for controlling access to the production system according to claim 1, wherein the linking to the information system and the authenticating by the information system from said terminal comprises:
during the enrollment step:
storing identification of the user of the terminal by an identifier in the information system, and
then, during the subsequent links:
receiving, by the information system, verification of the identifier and the stored identifier for the user.

8. The method for controlling access to the production system according to claim 1, wherein the linking to the information system by the terminal of the user and the authenticating by said information system are performed by a secure protocol used by an application stored on the terminal.

9. The method for controlling access to the production system according to claim 1, wherein the terminal is equipped with an image-capturing optical system and/or a link for wireless short-range and high-frequency communication.

10. The method for controlling access to the production system according to claim 1, wherein the encrypted private keys associated with each account of the user in the production system are image encryption codes composed of:
a QR code,
a datamatrix, and
a bar code.

11. The method for controlling access to the production system according to claim 1, wherein the linking of the user to the station comprises:
providing a link via said station to the production system or to a WEB application or to a WEB portal of the production system,
receiving an entry by the user of the identifier in the station, and
generating and displaying the encryption code on a screen of said station or in an authentication banner of the WEB application or the application portal.

12. The method for controlling access to the production system according to claim 1, wherein the linking to the information system comprises providing a link of the WEB Service or REST type on an HTTPS protocol.

13. The method for controlling access to the production system according to claim 8, wherein said link is made secure by a certificate from an authentication server of the information system, the terminal of the user having said certificate or having a certificate from the certification authority of the certificate.

14. A terminal of a user used for implementing a method for controlling access to a production system of a computer system by a user identified with said production system, said user terminal comprising:
at least one processor configured to
enroll the user in the production system by:
receiving an encrypted private key associated with each account of the user in the production system, and
transmitting the encrypted private key containing a private key for storing by the information system of said encrypted private key,
then, during a phase for authentication by the production system, for each request for access to the production system by the user by a station connected to the production system,
recovering an image encryption code displayed on said station, the image encryption code comprising a piece of encrypted data associated with the account of the user, the piece of encrypted data configured to be decrypted by the associated private key and stored in encrypted form in the information system,
linking to the information computer system for authentication of the user by said information system,
receiving the stored encrypted private key for the user account, transmitted by said information system, and
decrypting the encrypted private key with a secret key to obtain the private key that decrypts the recovered image encryption code and to obtain a password authorizing access to the user account of the production system.

15. The terminal according to claim 14, wherein an application is provided at the terminal and controlled by the at least one processor, using a mode for authentication with the information system via a secure link, identifications of the users and an authentication mode being stored in the information system.

16. The terminal according to claim 15, wherein the application is configured to decrypt the encrypted private key furnished by the information system, when the encrypted private key corresponds to the key encrypted with the secret key associated with the user account that it possesses.

17. A system for controlling access to the production system that is not connected to the information system of a computer system, the system comprising:

a terminal of a user used for implementing a method for controlling access to a production system of a computer system by a user identified with the production system, the terminal comprising:

at least one processor configured to
enroll the user in the production system by:
receiving an encrypted private key associated with each account of the user in the production system, and
transmitting the encrypted private key containing a private key for storing by the information system of said encrypted private key,
then, during a phase for authentication by the production system, for each request for access to the production system by the user by a station connected to the production system,
recovering an image encryption code displayed on said station, the image encryption code comprising a piece of encrypted data associated with the account of the user, the piece of encrypted data configured to be decrypted by the associated private key and stored in encrypted form in the information system,
linking to the information computer system for authentication of the user by said information system,
receiving the stored encrypted private key for the user account, transmitted by said information system, and
decrypting the encrypted private key with a secret key to obtain the private key that decrypts the recovered image encryption code and to obtain a password authorizing access to the user account of the production system,
wherein the production system has, in a memory, identifiers of the user accounts, and the public keys and the private keys associated with each user, the production system being configured to encrypt one of the private keys the associated public key and to generate an image encryption code comprising said private key, and
wherein the information system has a server that has an authentication base or is connected to an authentication server.

18. The terminal according to claim 14, wherein the application is configured to decrypt the encrypted private key furnished by the information system, when the encrypted private key corresponds to the key encrypted with the secret key associated with the user account that it possesses.

19. The method for controlling access to the production system according to claim 9, wherein when the terminal is equipped with a link for wireless short-range and high-frequency communication, the short-range wireless communication is achieved by Bluetooth or Near Field Communication (NFC) (Near Field Communication).

20. The method for controlling access to the production system according to claim 19, wherein the short-range wireless communication is achieved by Bluetooth or Near Field Communication (NFC) (Near Field Communication) using a mobile telephone or a portable tablet.

* * * * *